United States Patent
Shi et al.

(10) Patent No.: US 12,407,235 B2
(45) Date of Patent: Sep. 2, 2025

(54) DIRECT DRIVE SYSTEM

(71) Applicant: AAC Microtech (Changzhou) Co., Ltd., Changzhou (CN)

(72) Inventors: Weiling Shi, Shenzhen (CN); Yu Qin, Shenzhen (CN); Shun Guo, Shenzhen (CN); Min Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/915,508

(22) PCT Filed: Jul. 21, 2022

(86) PCT No.: PCT/CN2022/106916
§ 371 (c)(1),
(2) Date: Sep. 29, 2022

(87) PCT Pub. No.: WO2024/000699
PCT Pub. Date: Jan. 4, 2024

(65) Prior Publication Data
US 2025/0125703 A1    Apr. 17, 2025

(30) Foreign Application Priority Data
Jun. 30, 2022  (CN) .......................... 202221689497.9

(51) Int. Cl.
*H02K 41/03*    (2006.01)
(52) U.S. Cl.
CPC ................... *H02K 41/031* (2013.01)

(58) Field of Classification Search
CPC .................................................. H02K 41/031
See application file for complete search history.

(56) References Cited

U.S. PATENT DOCUMENTS 11,277,063 B2 *  3/2022  Trolliet ................ H02K 41/031

FOREIGN PATENT DOCUMENTS

| CN | 109004805 B | * | 4/2020 | ............ H02K 16/02 |
| CN | 111049354 A | * | 4/2020 | |
| CN | 109586543 B | * | 11/2020 | ........... H02K 41/031 |
| CN | 112187008 A | * | 1/2021 | ............... H02K 1/18 |

(Continued)

*Primary Examiner* — Mohamad A Musleh
(74) *Attorney, Agent, or Firm* — Wiersch Law Group

(57) ABSTRACT

The present disclosure provides direct drive system, belongs to drive systems field. The direct drive system includes: base and slide spaced from the base, the base being provided with stator assembly, slide being provided with rotor assembly; rotor assembly including a first magnetic conductor and a plurality of magnets arranged on the first magnetic conductor; the stator assembly including second magnetic conductors and windings spaced on second magnetic conductors, windings being arranged opposite magnets, and magnetic field generated by windings covering magnets to generate electromagnetic thrust with magnet to drive the slide to move along sliding direction. Windings are spaced, and coils in each group of winding are cooperatively energized to drive rotor assembly with magnets to operate, which effectively reduce consumption of coils, reduce material costs, reduce heating quantity, reduce energy consumption of direct drive system, to improve operation efficiency of direct drive system.

8 Claims, 5 Drawing Sheets

(56) References Cited

FOREIGN PATENT DOCUMENTS

| | | | | | |
|---|---|---|---|---|---|
| CN | 112187009 | A | * | 1/2021 | ............... H02K 1/18 |
| CN | 112234795 | A | * | 1/2021 | ............. H02K 11/21 |
| JP | 2006353024 | A | * | 12/2006 | |
| WO | WO-9112648 | A1 | * | 8/1991 | |

* cited by examiner

DIRECT DRIVE SYSTEM

TECHNICAL FIELD

The present disclosure relates to the technical field of drive systems, and in particular, to a direct drive system.

BACKGROUND

A motor in a direct drive system generally includes a stator assembly and a rotor assembly interacting with each other. The stator assembly includes an iron core and coils arranged on the iron core. The coils in the related art are arranged close to each other. The arrangement may lead to an increase in consumption of the coils and the iron core and in material costs. Secondly, greater consumption of the coils may further increase a heating quantity, resulting in an increase in energy consumption, and further reduce operation efficiency of the direct drive system.

Therefore, there is a need to provide a new direct drive system to solve the above technical problems.

SUMMARY

The present disclosure is intended to provide a direct drive system, so as to solve at least one of the technical problems existing in the related art.

The present disclosure provides a direct drive system, including a base and a slide spaced from the base, the base being provided with a stator assembly, the slide being provided with a rotor assembly;

the rotor assembly including a first magnetic conductor and a plurality of magnets arranged on the first magnetic conductor;

the stator assembly including at least one group of second magnetic conductors and a plurality of groups of windings spaced on the second magnetic conductors, the windings being arranged opposite the magnets, and a magnetic field generated by at least one group of the windings covering at least one of the magnets so as to generate an electromagnetic thrust force with the magnet to drive the slide to move along a sliding direction.

As an improvement, an interval length between two adjacent groups of the windings is less than a total length of the plurality of magnets.

As an improvement, the stator assembly includes a group of second magnetic conductors, the second magnetic conductors being successively arranged along the sliding direction.

As an improvement, the stator assembly includes a plurality of groups of second magnetic conductors, the plurality of groups of second magnetic conductors being spaced along the sliding direction, the second magnetic conductors being in one-to-one correspondence to the windings.

As an improvement, each group of the second magnetic conductors is provided with auxiliary teeth on at least one of two ends along a length direction thereof.

As an improvement, the second magnetic conductor includes a magnetically conductive substrate and a plurality of teeth arranged on the magnetically conductive substrate; and each group of the windings includes a plurality of coils, the coils are sleeved on the teeth.

As an improvement, the base includes a top plate, and the second magnetic conductors and the plurality of groups of windings are sequentially arranged on an inner surface of the top plate; and the first magnetic conductor and the plurality of magnets are sequentially arranged on the side of the slide facing the top plate.

As an improvement, the base further includes a bottom plate spaced from the top plate, the bottom plate being provided with a guide rail on an inner surface; and at least one slidable slider is arranged on the side of the slide facing the bottom plate, and the slide moves on the guide rail through the slider.

As an improvement, an orthographic projection of the guide rail on the base along the sliding direction of the slide falls on an outer side of the base.

As an improvement, the base further includes a side plate connected between the top plate and the bottom plate, the side plate being provided with at least one first position feedback member along the sliding direction; and a second position feedback member is arranged on the side of the slide facing the side plate, the second position feedback member being arranged opposite and spaced from the at least one first position feedback member.

In the present disclosure, a plurality of groups of windings are spaced, and the coils in each group of winding are cooperatively energized to drive the rotor assembly with magnets to operate, which can effectively reduce consumption of the coils, reduce material costs, further reduce a heating quantity, and reduce energy consumption, so as to improve operation efficiency of the direct drive system.

DESCRIPTION OF EMBODIMENTS

Figure 1:
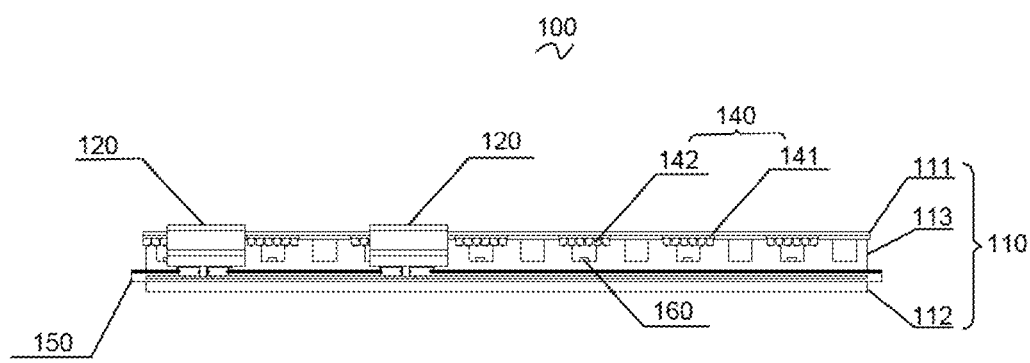
FIG. 1 is a schematic structural diagram of a direct drive system according to an embodiment of the present disclosure.
Figure 2:
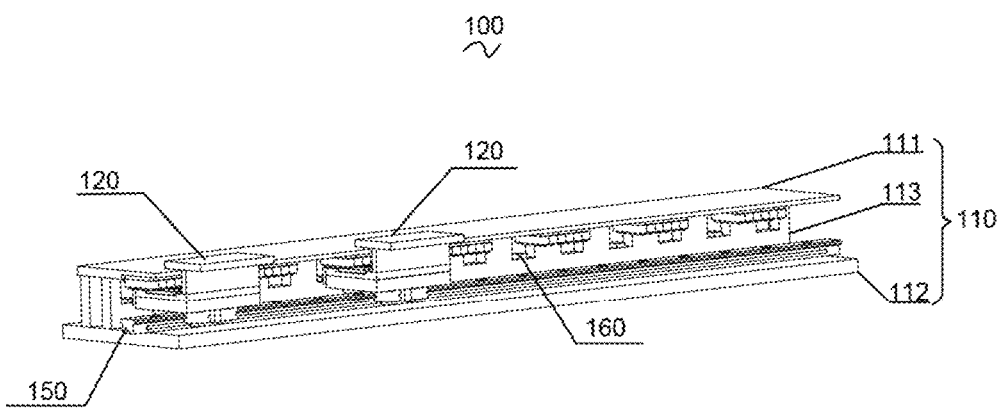
FIG. 2 is a schematic structural diagram of the direct drive system according to another embodiment of the present disclosure.
Figure 3:
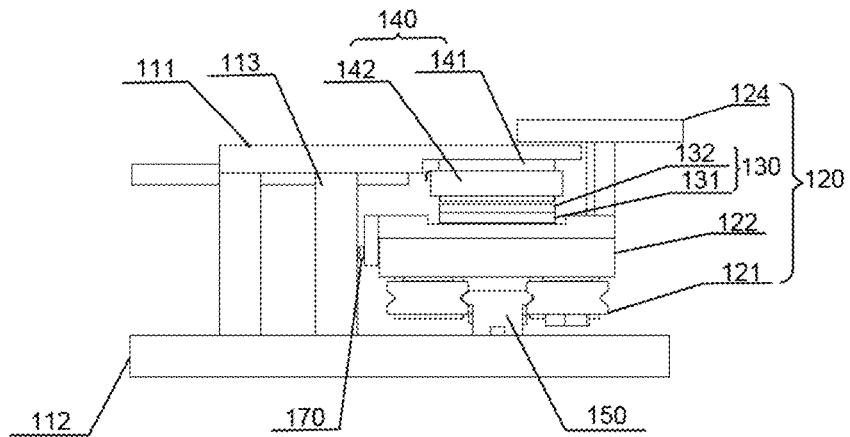
FIG. 3 is a sectional view of the direct drive system according to another embodiment of the present disclosure.

To enable those skilled in the art to better understand the technical solution of the present disclosure, the present disclosure is described in further detail below with reference to the accompanying drawings and specific embodiments.

In some descriptions of the present disclosure, unless otherwise explicitly specified and limited, the terms "mount", "connect", "couple" or "fix" and other similar terms are not limited to physical or mechanical connections, but may include electrical connections, either directly or indirectly through intermediate media, which may be an internal connection of two elements, or an interaction of two elements. Moreover, the orientation or position relationship indicated by the terms "central", "longitudinal", "transverse", "length", "width", "thickness", "upper", "lower", "front", "back", "left", "right", "vertical", "horizontal", "top", "bottom", "inner", "outer", etc. are based on the orientation or position relationship shown in the accompanying drawings and are only intended to indicate a relative position relationship. The relative position relationship may be correspondingly changed when an absolute position of a described object is changed.

As shown in FIG. 1 to FIG. 10, the present disclosure provides a direct drive system 100, including: a base 110 and a slide 120 spaced from the base 110. The base 120 is provided with a stator assembly 130. The slide 110 is provided with a rotor assembly 140. The rotor assembly 130 includes a first magnetic conductor 131 and a plurality of magnets 132 arranged on the first magnetic conductor 131. The stator assembly 140 includes at least one group of second magnetic conductors 141 and a plurality of groups of windings 142 spaced on the second magnetic conductors 141, the windings 142 are arranged opposite the magnets 132, and a magnetic field generated by at least one group of the windings 142 covers at least one of the magnets 132 so as to generate an electromagnetic thrust force with the magnet 132 to drive the slide 120 to move along a sliding direction.

In this embodiment, the stator assembly are provided with a plurality of groups of windings, and the plurality of groups of windings are spaced, and cooperative energization of the coils in each group of winding can effectively reduce consumption of the coils, reduce material costs, further reduce a heating quantity, and reduce energy consumption, so as to improve operation efficiency of the direct drive system.

An operating principle of the direct drive system in this embodiment is as follows. When an appropriate current is supplied into the winding on the stator assembly, the winding generates a traveling wave magnetic field, the magnet in the rotor assembly induces a magnetic field, a gap magnetic field is generated between the magnet and the winding, and then driving force is generated to drive the rotor assembly with magnet and the slide to move along the sliding direction.

It is to be understood that, to enable the magnet in the rotor assembly to induce a magnetic field, an air-gap magnetic field is generated between the magnet and the winding, and along the sliding direction of the slide, an interval length between the groups of the windings is required to be less than a length of the first magnetic conductor or a total length of the plurality of magnets on the rotor assembly. That is, the lengths of the first magnetic conductor and the magnets are required to be long enough to ensure that an air-gap magnetic field can be generated between the winding and the magnet at any time, so that the rotor assembly can be driven by different windings when passing through different windings.

In some optional embodiments, as shown in FIG. 5 to FIG. 8, the stator assembly 140 includes a plurality of groups of second magnetic conductors 141. The plurality of groups of second magnetic conductors 141 are spaced along the sliding direction. The second magnetic conductors 141 are in one-to-one correspondence to the windings 142. That is, each group of windings are arranged on spaced second magnetic conductors.

In this embodiment, the second magnetic conductors and the plurality of groups of windings are synchronously spaced, so as to further reduce the consumption of the magnetic conductors to reduce material costs.

Figure 7:
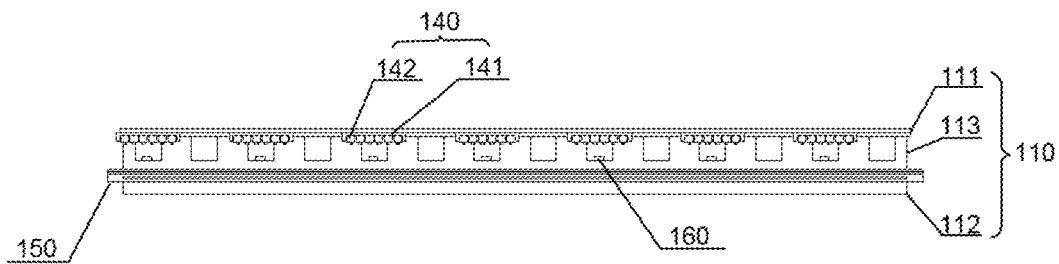
FIG. 7 is a schematic structural diagram of a stator unit according to another embodiment of the present disclosure.
Figure 8:
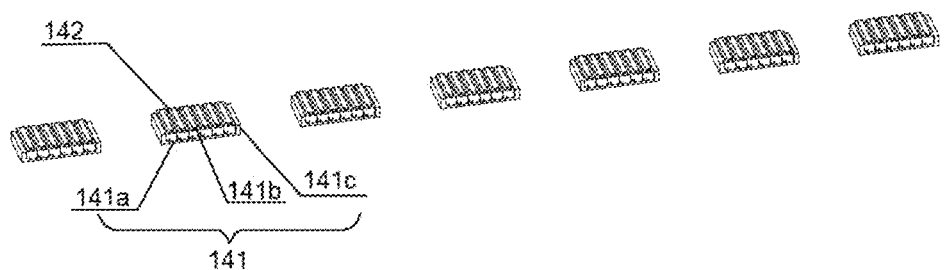
FIG. 8 is a schematic structural diagram of a stator assembly according to another embodiment of the present disclosure.

As a further optional solution, as shown in FIG. 7 and FIG. 8, each group of the second magnetic conductors 141 is provided with auxiliary teeth 141c on at least one of two ends along a length direction thereof. That is, auxiliary teeth are arranged on one end or two ends of the magnetically conductive substrate in each group of second magnetic conductors.

As a furthermore optional solution, as shown in FIG. 7 and FIG. 8, each group of the second magnetic conductors 141 is provided with auxiliary teeth 141c on two ends along a length direction thereof.

In this embodiment, the arrangement of the auxiliary teeth on the end of the second magnetic conductors can reduce thrust fluctuations.

Figure 9:
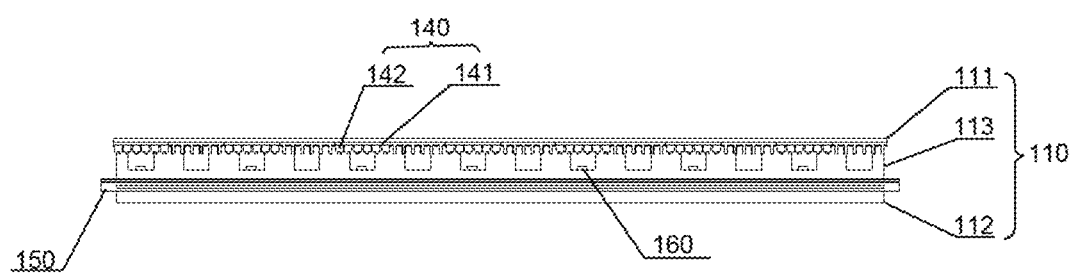
FIG. 9 is a schematic structural diagram of a stator unit according to another embodiment of the present disclosure.
Figure 10:
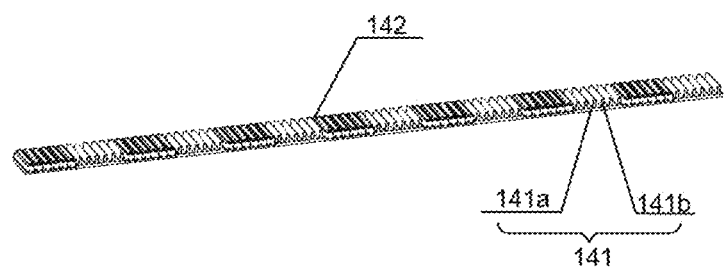
FIG. 10 is a schematic structural diagram of a stator assembly according to another embodiment of the present disclosure.

In some other optional embodiments, as shown in FIG. 9 and FIG. 10, the stator assembly 140 includes a group of second magnetic conductors 141. The group of second magnetic conductors 141 are successively arranged along the sliding direction. The plurality of groups of windings 142 are spaced on the second magnetic conductors 141.

In this embodiment, the second magnetic conductors are successively arranged, and the windings are spaced on the second magnetic conductors, which can further reduce the thrust fluctuations compared with that arrangement that the second magnetic conductors and the windings are synchronously spaced.

Further, as shown in FIG. 5 to FIG. 10, the second magnetic conductor 141 includes a magnetically conductive substrate 141a and a plurality of teeth 141b arranged on the magnetically conductive substrate 141a. Each group of the windings 142 includes a plurality of coils, and each of the coils sleeves each of the teeth 141b.

It is to be understood that the coil is further connected to an external power supply, and the coil is energized by an external drive control system connected to the coil. When a current is supplied into the coil, the coil generates a traveling wave magnetic field, the magnet induces a magnetic field, an air-gap magnetic field is generated between the magnet and the coil, and thrust is generated between the magnet and the coil to drive the slide to move along the sliding direction.

Furthermore, as shown in FIG. 1 to FIG. 4, the base 110 includes a top plate 111, and the second magnetic conductors 141 and the plurality of groups of windings 142 are sequentially arranged on an inner surface of the top plate 111. That is, the second magnetic conductors are arranged on the inner surface of the top plate along the sliding direction, and the plurality of groups of windings are arranged on the second magnetic conductors along the sliding direction. The first magnetic conductor 131 and the plurality of magnets 132 are sequentially arranged on the side of the slide 120 facing the top plate 111. That is, the first magnetic conductor is arranged on the slide along the sliding direction, the plurality of magnets are arranged on the first magnetic conductor along the sliding direction, and the plurality of magnets are spaced and arranged opposite the plurality of groups of windings.

As a further optional solution, the plurality of groups of windings are arranged on the second magnetic conductors, and the plurality of magnets are spaced on the first magnetic conductor.

It is to be noted that the magnets in this embodiment may be first mounted on the first magnetic conductor and then wholly mounted on the slide.

Furthermore, as shown in FIG. 1 to FIG. 4, the base 110 further includes a bottom plate 112 spaced from the top plate 111, and an inner surface of the bottom plate 112 is provided with a guide rail 150 along the sliding direction. At least one slidable slider 121 is arranged on the side of the slide 120 facing the bottom plate 112, and the slide 120 moves on the guide rail 150 through the slider 121.

It is to be noted that the structure and the number of the slider in this embodiment are not specifically limited, which may be specifically set according to the structure of the guide rail. For example, when the guide rail is provided with sliding portions on two sides, two slider or four sliders may be symmetrically arranged below the slide, so that the slider slides on the sliding portion.

It is to be noted that the existing direct drive system has a fixed length, a direct drive system with a specific length is required to be selected in different applications, and a length of a motor is limited, leading to poor use flexibility and versatility. Therefore, the length of the direct drive system may be adjusted according to an actual requirement. That is, stator units can be modularized, and a plurality of stator units can be spliced.

Figure 4:
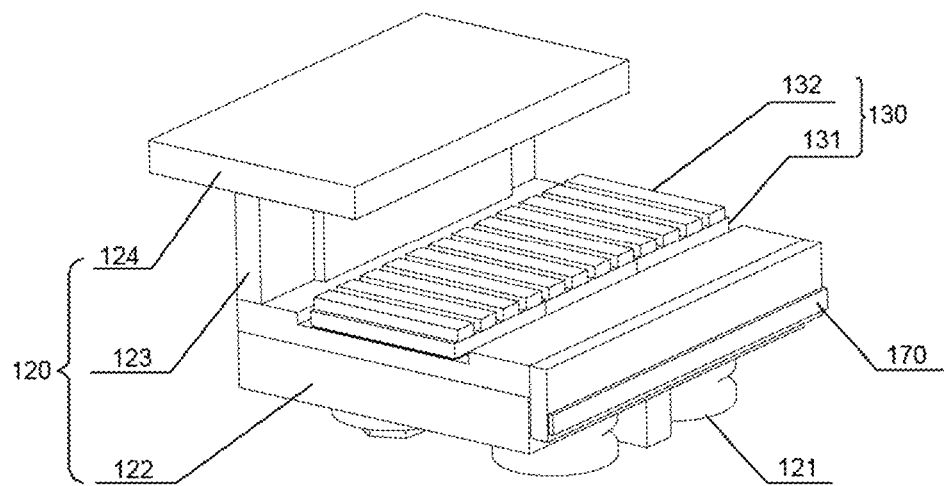
FIG. 4 is a schematic structural diagram of a rotor unit according to another embodiment of the present disclosure.
Figure 5:
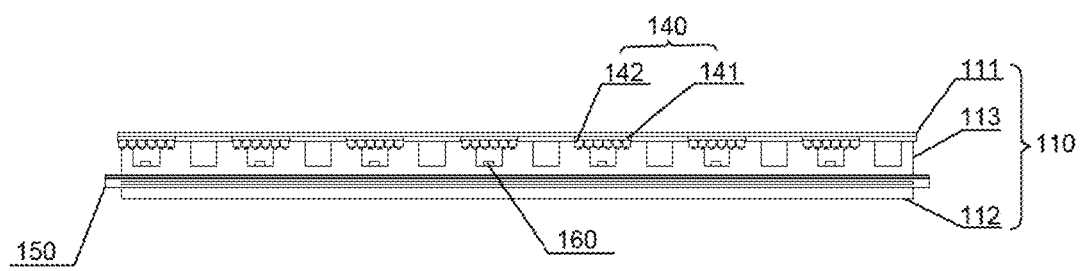
FIG. 5 is a schematic structural diagram of a stator unit according to another embodiment of the present disclosure.
Figure 6:
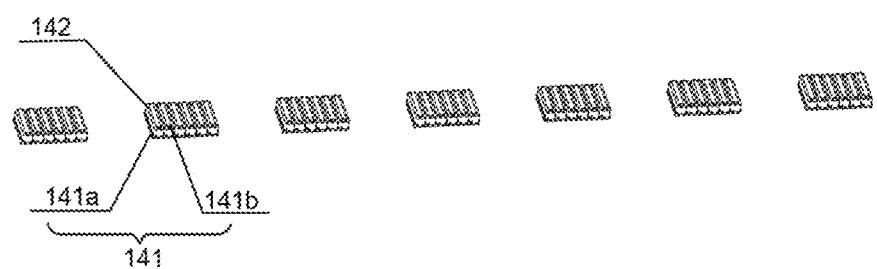
FIG. 6 is a schematic structural diagram of a stator assembly according to another embodiment of the present disclosure.

As a further optional solution, as shown in FIG. 1 and FIG. 4, an orthographic projection of the guide rail 150 on the base 110 along the sliding direction of the slide falls on an outer side of the base 110, so that, when the base is spliced with structures such as the stator assembly, the guide rail is contacted at first, which can ensure smooth connection of the guide rail, and other parts are at a slightly larger distance, so that incomplete contact with the guide rail and first contact with the other parts may not occur, reducing the difficulty of assembly and maintenance of the system.

Furthermore, as shown in FIG. 1 to FIG. 4, the base 110 further includes a side plate 113 connected between the top plate 111 and the bottom plate 112, and the side plate 113 is provided with at least one first position feedback member 160 along the sliding direction of the slide 120. A second position feedback member 170 is arranged on the side of the slide 120 facing the side plate 113, and the second position feedback member 170 is arranged opposite and spaced from the at least one first position feedback member 160.

As a further optional solution, a plurality of mounting grooves are spaced on the side plate, and the first position feedback members are arranged in the corresponding mounting grooves.

As a furthermore optional solution, the first position feedback member may be a scale, and the second position feedback member may be a scale reading head.

The second position feedback member in this embodiment moves synchronously on the slide. When the slide passes through the first position feedback member, the first position feedback member may sense position information on the second position feedback member, and transmit position information of the rotor assembly and the slide to the external drive control system, so as to realize drive control over the rotor assembly.

It is to be noted that this embodiment does not specifically limit the specific structure of the slide, which may be a combination of a plurality of substructures or a whole structure.

Specifically, as shown in FIG. 1 to FIG. 4, the slide 120 includes a first plate body 122 arranged opposite and spaced from the top plate 111, the first magnetic conductor 131 and the plurality of magnets 132 are arranged on the side of the first plate body 122 facing the top plate 111, the slider 121 is arranged on the side of the first plate body 122 facing the bottom plate 112, and the second position feedback member 170 is arranged on the side of the first plate body 122 facing the side plate 113.

Further, still referring to FIG. 1 to FIG. 4, the slide 120 further includes an extension plate 123 extending upward above the top plate 111 from the first plate body 122, and a second plate body 124 connected to the extension plate 123 and arranged opposite the first plate body 122. That is, the second plate body 124 is arranged above the top plate 111. The stator assembly and the rotor assembly generate relative thrust to drive the slide to slide relative to the base.

It is to be noted that, in this embodiment, the base and the stator assembly and the guide rail that are arranged thereon form a stator unit, the slide and the rotor assembly arranged thereon form a rotor unit, and the stator assembly and the rotor assembly interact to drive the slide to move on the guide rail.

It is to be further noted that the stator assembly in this embodiment includes a variety of shapes such as a straight line, a circular arc, and a sector, which is not specifically limited.

It is to be further noted that each stator assembly may be provided with a rotor assembly. Certainly, one stator assembly may also be equipped with two, three or more rotor assemblies.

The present disclosure provides a direct drive system, which has the following beneficial effects compared with the related art. The plurality of groups of windings and the second magnetic conductors are spaced, and the groups of windings are cooperatively energized to drive the rotor assembly with magnets to move, which can reduce consumption of the stator assembly such as the coils, and reduce costs. Moreover, the coils are spaced, which can reduce a heating quantity, further reduce energy consumption, and improve operation efficiency of the direct drive system.

It may be understood that the above embodiments are only exemplary embodiments intended to illustrate the principle of the present disclosure, but the present disclosure is not limited thereto. For those of ordinary skill in the art, various variations and improvements can be made without deviating from the spirit and essence of the present disclosure, and these variations and improvements are also regarded as the protection scope of the present disclosure.

What is claimed is:

1. A direct drive system, comprising:
   a base, provided with a stator assembly; and
   a slide, spaced from the base and provided with a rotor assembly, wherein
   the rotor assembly comprises a first magnetic conductor and magnets arranged on the first magnetic conductor;
   the stator assembly comprises at least one group of second magnetic conductors, and groups of windings spaced on the at least one group of second magnetic conductors, wherein the groups of windings are arranged opposite to the magnets, and a magnetic field generated by at least one group of the groups of windings covers at least one magnet of the magnets, so as to generate an electromagnetic thrust force with the magnet to drive the slide to move along a sliding direction;
   wherein the stator assembly comprises groups of second magnetic conductors, and the groups of second magnetic conductors are spaced along the sliding direction, and are in one-to-one correspondence to the groups of windings;
   wherein each group of the groups of second magnetic conductors is provided with auxiliary teeth on at least one of two ends along a length direction thereof.

2. The direct drive system as described in claim 1, wherein a length of an interval between two adjacent groups of the groups of windings is smaller than a total length of the magnets.

3. The direct drive system as described in claim 1, wherein the stator assembly comprises a group of second magnetic conductors, and the second magnetic conductors of the at least one group of second magnetic conductors are successively arranged along the sliding direction.

4. The direct drive system as described in claim 3, wherein each group of second magnetic conductors comprises a magnetically conductive substrate and teeth arranged on the magnetically conductive substrate; and each group of windings comprises coils, and the coils are sleeved on the teeth.

5. The direct drive system as described in claim 1, wherein the base comprises a top plate, and the second magnetic conductors of the at least one group of second magnetic conductors and the groups of windings are sequentially arranged on an inner surface of the top plate; and the first magnetic conductor and the magnets are sequentially arranged on a side of the slide facing the top plate.

6. The direct drive system as described in claim 5, wherein the base further comprises a bottom plate spaced from the top plate, the bottom plate is provided with a guide rail on an inner surface of the bottom plate; and at least one slider that is slidable is arranged on a side of a slide facing the bottom plate, and the slide moves on the guide rail by means of the at least one slider.

7. The direct drive system as described in claim 6, wherein an orthographic projection of the guide rail on the base along the sliding direction of the slide falls outside of the base.

8. The direct drive system as described in claim 7, wherein the base further comprises a side plate connected between the top plate and the bottom plate, the side plate is provided with at least one first position feedback member along the sliding direction; and a second position feedback member is arranged on a side of the slide facing the side plate, and the second position feedback member is arranged opposite to and spaced from the at least one first position feedback member.

* * * * *